United States Patent
Maoz

(10) Patent No.: US 12,028,349 B2
(45) Date of Patent: Jul. 2, 2024

(54) PROTECTING PHYSICAL LOCATIONS WITH CONTINUOUS MULTI-FACTOR AUTHENTICATION SYSTEMS

(71) Applicant: Cisco Technology, Inc., San Jose, CA (US)

(72) Inventor: Tal Maoz, Jerusalem (IL)

(73) Assignee: Cisco Technology, Inc., San Jose, CA (US)

(*) Notice: Subject to any disclaimer, the term of this patent is extended or adjusted under 35 U.S.C. 154(b) by 354 days.

(21) Appl. No.: 17/340,349

(22) Filed: Jun. 7, 2021

(65) Prior Publication Data

US 2022/0394042 A1    Dec. 8, 2022

(51) Int. Cl.
  *H04L 29/00* (2006.01)
  *H04L 9/40* (2022.01)

(52) U.S. Cl.
  CPC ........ *H04L 63/107* (2013.01); *H04L 63/0876* (2013.01); *H04L 63/102* (2013.01); *H04L 63/20* (2013.01); *H04L 2463/082* (2013.01)

(58) Field of Classification Search
  CPC . H04L 63/145; H04L 63/1416; H04L 63/102; H04L 63/107; H04L 63/20; H04L 63/0876; H04L 2463/082; H04W 12/12; H04W 12/128
  See application file for complete search history.

(56) References Cited

U.S. PATENT DOCUMENTS

| | | | |
|---|---|---|---|
| 7,689,231 B2 | 3/2010 | Mardiks et al. | |
| 9,721,111 B2 | 8/2017 | Cavanaugh | |
| 10,462,184 B1* | 10/2019 | Gu | H04W 4/33 |
| 11,024,105 B1* | 6/2021 | Brand | G06K 7/10366 |
| 11,151,481 B1* | 10/2021 | Sun | G06V 40/161 |
| 11,184,766 B1* | 11/2021 | Lord | G06V 10/75 |
| 11,398,123 B1* | 7/2022 | Mars | G07C 9/21 |
| 11,461,713 B1* | 10/2022 | Raj | G06Q 10/06312 |
| 11,514,740 B1* | 11/2022 | Ullmann | G07C 9/28 |
| 11,544,978 B2* | 1/2023 | Kusens | G07C 9/27 |
| 2005/0064856 A1 | 3/2005 | Atkin et al. | |
| 2007/0083915 A1* | 4/2007 | Janakiraman | G06F 21/6218 726/4 |
| 2012/0068814 A1* | 3/2012 | Crawford | H04L 9/3234 340/5.6 |
| 2014/0208095 A1* | 7/2014 | Stuntebeck | H04L 63/168 713/152 |
| 2016/0100046 A1 | 4/2016 | Meru et al. | |
| 2016/0286394 A1* | 9/2016 | Iyer | H04L 63/08 |
| 2018/0007060 A1* | 1/2018 | Leblang | H04L 63/107 |
| 2018/0349375 A1* | 12/2018 | Jones | H04L 67/1021 |
| 2019/0043281 A1* | 2/2019 | Aman | G07C 9/215 |
| 2019/0266518 A1* | 8/2019 | Medina | H04W 4/024 |
| 2019/0303561 A1* | 10/2019 | Humble | H04L 63/123 |
| 2020/0045790 A1 | 2/2020 | Pederson | |

(Continued)

Primary Examiner — Don G Zhao
(74) Attorney, Agent, or Firm — Polsinelli P.C.

(57) ABSTRACT

This disclosure relates to methods, systems, and non-transitory computer-readable storage media for integrating a multi-factor authentication system with a security system. The present technology can receive authentication data descriptive of a user associated with a user device. The present technology can also permit the user to access a secure physical location. The present technology can also limit capabilities of the user device while the user is within the secure physical location.

17 Claims, 4 Drawing Sheets

(56) References Cited

U.S. PATENT DOCUMENTS

| | | | | |
|---|---|---|---|---|
| 2020/0184757 | A1* | 6/2020 | Moeller | G07C 9/00571 |
| 2020/0202647 | A1* | 6/2020 | Zhong | G07C 9/00309 |
| 2020/0358608 | A1* | 11/2020 | Stanton | H04L 9/0872 |
| 2021/0056792 | A1* | 2/2021 | Troesch | G07C 9/23 |
| 2021/0158462 | A1* | 5/2021 | Kuhlman | G06F 16/2379 |
| 2021/0258719 | A1* | 8/2021 | Bosworth | H04W 4/44 |
| 2021/0357491 | A1* | 11/2021 | Teller | H04W 12/33 |
| 2022/0101306 | A1* | 3/2022 | Rule | G06Q 20/3278 |
| 2022/0124111 | A1* | 4/2022 | Johnson | G06N 5/025 |
| 2022/0230495 | A1* | 7/2022 | Bajaj | G07C 9/00571 |
| 2022/0318350 | A1* | 10/2022 | Hulick, Jr. | G06F 21/52 |
| 2023/0095529 | A1* | 3/2023 | Akutsu | G07C 9/37 |
| | | | | 340/5.83 |

* cited by examiner

PROTECTING PHYSICAL LOCATIONS WITH CONTINUOUS MULTI-FACTOR AUTHENTICATION SYSTEMS

DESCRIPTION OF THE RELATED TECHNOLOGY

The present technology pertains to integrating a multi-factor authentication system with a security system, and more specifically, the present technology pertains to utilizing a multi-factor authentication system agent to disable functions of a personal computing device within a secure physical location.

BACKGROUND

Security breaches are a major problem facing today's enterprises. The average cost of a security breach has risen to over 8 million dollars, and approximately one-quarter of these breaches are committed by internal actors, whether intentionally or accidentally. Disincentivizing security breaches would be a major boon to today's enterprises, saving them money, loss of trust, and PR debacles.

While security breaches can take a variety of forms, one common type of breach involves an unauthorized or authorized individual gaining access to a secure physical location. Once inside, this individual could conduct espionage to steal enterprise secrets or other valuable and secure information.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
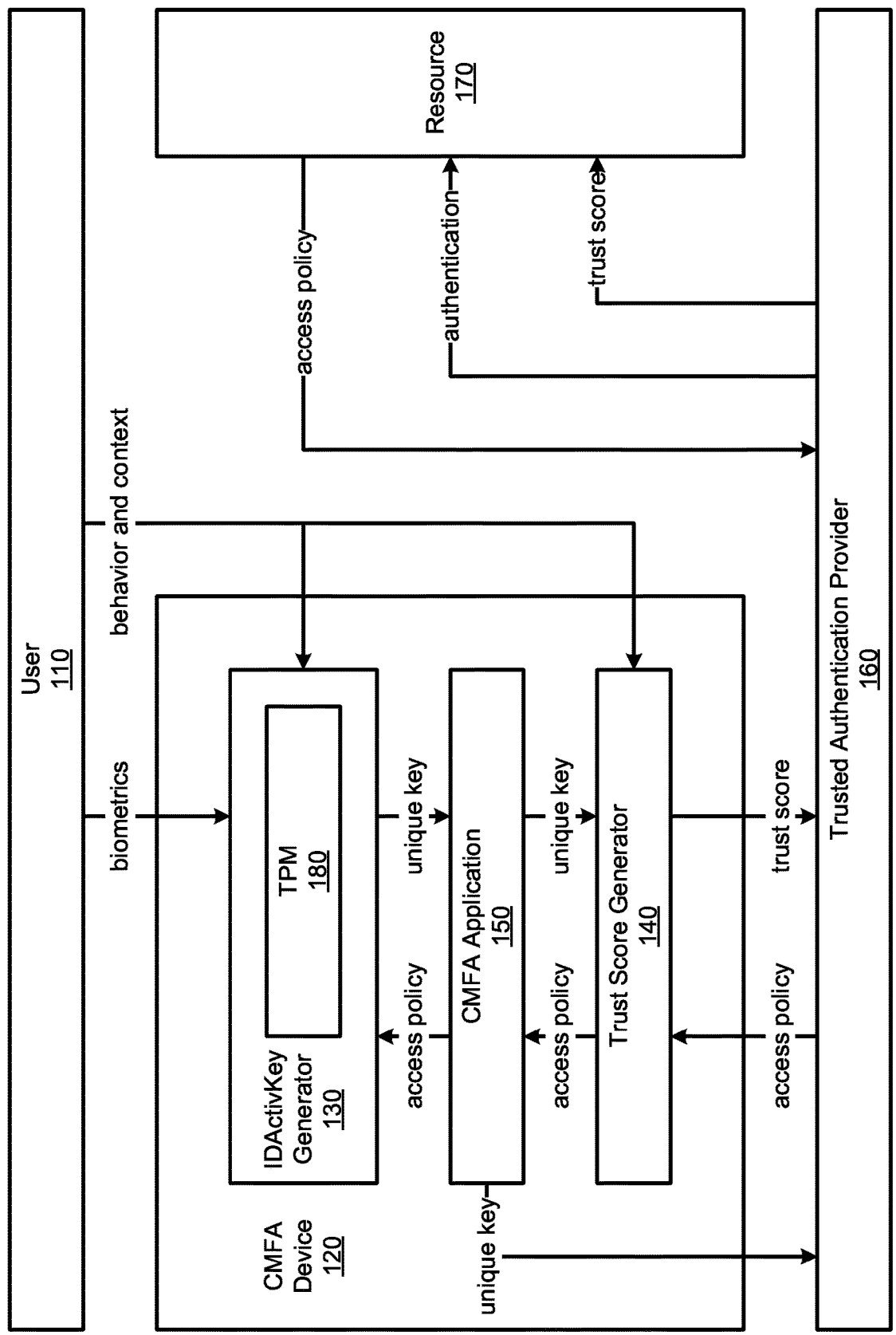
FIG. 1 illustrates an example continuous multi-factor authentication (CMFA) system in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

The present technology provides methods, systems, and non-transitory computer-readable storage media for integrating a multi-factor authentication system with a security system.

A method can include receiving authentication data descriptive of a user associated with a user device. The method can also include permitting the user to access a secure physical location. The method can also include, while the user is within the secure physical location, limiting capabilities of the user device.

In some embodiments of the method, the method can further include, in response to receiving the request to access the secure physical location, sending a first request for a first portion of the authentication data descriptive of the user to a continuous multi-factor authentication application on the user device.

In some embodiments of the method, the method can include wherein in addition to sending the request for the authentication data descriptive of the user to the continuous multi-factor authentication application on the user device, also sending a second request for a second portion of the authentication data descriptive of the user to devices in proximity to an entrance to the secure physical location.

In some embodiments of the method, the first request for the first portion of the authentication data descriptive of the user can specify characteristics of a type and/or quality of the first portion of authentication data descriptive of the user, wherein the type and/or quality of the first portion of the authentication data descriptive of the user is specified in an access policy for the secure physical location.

In some embodiments of the method, the user can be permitted to access the secure physical location when the authentication data descriptive of the user associated with the user device meets authentication criteria defined in an access policy configured on an authentication service.

In some embodiments of the method, permitting the user to access the secure physical location includes sending a communication to a lock actuation device associated with the secure physical location, wherein the communication is a trusted communication which indicates that the user associated with the user device should be permitted to access the secure physical location.

In some embodiments of the method, limiting the capabilities of the user device includes receiving, from the user device, an indication that the user is about to enter or has entered the secure physical location. The method can also include sending a communication to a security application on the user device informing the security application about at least one secure area technological requirement as defined in an access policy configured on an authentication service. The method can also include receiving a communication from the security application confirming that the user device has been configured to meet the at least one secure area technological requirement.

In some embodiments of the method, the request to access the secure physical location can be at least one request from each user device in proximity to the secure physical location, and permitting the user to access the secure physical location is conditional upon receiving the authentication data descriptive of each user associated each user device that meets authentication criteria defined in an access policy.

In some embodiments of the method, the method also includes receiving personal identifying information from at least one device in proximity to the user. The method also includes determining that the personal identifying information identifies an individual other than the user of the user device. The method also includes providing access or taking additional steps as defined in an access policy for the secure physical location, wherein the access policy defines a protocol for an authenticated user being accompanied by a non-authenticated individual.

A system can include at least one processor and a non-transitory computer-readable storage medium comprising instructions stored thereon which, when executed by the at least one processor, cause the at least one processors to receive authentication data descriptive of a user associated with a user device. The at least one processors can also be caused to permit the user to access a secure physical location. The at least one processors can also be caused to, while the user is within the secure physical location, limit capabilities of the user device.

In some embodiments of the system, the at least one processors can also be caused to, in response to receiving the request to access the secure physical location, send a first request for a first portion of the authentication data descriptive of the user to a continuous multi-factor authentication application on the user device.

In some embodiments of the system, the at least one processors can also be caused to send a second request for a second portion of the authentication data descriptive of the user to devices in proximity to an entrance to the secure physical location.

In some embodiments of the system, the first request for the first portion of the authentication data descriptive of the user can specify characteristics of a type and/or quality of the first portion of authentication data descriptive of the user, wherein the type and/or quality of the first portion of the authentication data descriptive of the user is specified in an access policy for the secure physical location.

In some embodiments of the system, the request to access the secure physical location can be at least one request from each user device in proximity to the secure physical location, and permitting the user to access the secure physical location is conditional upon receiving the authentication data descriptive of each user associated each user device that meets authentication criteria defined in an access policy.

In some embodiments of the system, the at least one processors and the non-transitory computer-readable storage medium can be part of a security system.

A non-transitory computer-readable storage medium can include instructions stored thereon which, when executed by a processor, cause the processor to receive authentication data descriptive of a user associated with a user device. The instructions can also cause the processor to permit the user to access a secure physical location. The instructions can also cause the processor to, while the user is within the secure physical location, limit capabilities of the user device.

In some embodiments of the non-transitory computer-readable storage medium, the user can be permitted to access the secure physical location when the authentication data descriptive of the user associated with the user device meets authentication criteria defined in an access policy configured on an authentication service.

In some embodiments of the non-transitory computer-readable storage medium, permitting the user to access the secure physical location can cause the processor to send a communication to a lock actuation device associated with the secure physical location, wherein the communication is a trusted communication which indicates that the user associated with the user device should be permitted to access the secure physical location.

In some embodiments of the non-transitory computer-readable storage medium, limiting the capabilities of the user device can cause the processor to receive, from the user device, an indication that the user is about to enter or has entered the secure physical location. Limiting the capabilities of the user device can also cause the processor to send a communication to a security application on the user device informing the security application about at least one secure area technological requirement as defined in an access policy configured on an authentication service. Limiting the capabilities of the user device can also cause the processor to receive a communication from the security application confirming that the user device has been configured to meet the at least one secure area technological requirement.

In some embodiments of the non-transitory computer-readable storage medium, the instructions can cause the processor to receive personal identifying information from at least one device in proximity to the user. The instructions can also cause the processor to determine that the personal identifying information identifies an individual other than the user of the user device. The instructions can also cause the processor to provide access or take additional steps as defined in an access policy for the secure physical location, wherein the access policy defines a protocol for an authenticated user being accompanied by a non-authenticated individual.

DESCRIPTION OF EXAMPLE EMBODIMENTS

Security breaches are a serious problem are a serious problem for enterprise operations. In 2020, the average cost of a security breach was over $8 m per breach.

Security systems provide some protection against unauthorized security breaches committed by obtaining unauthorized access to secure physical locations. While existing systems may utilize keypads, retina scans, or other means to identify individuals before they can enter secure physical locations, these solutions can be improved upon. For example, many existing systems are only one or two dimensional in nature and can be spoofed, whereas multi-factor authentication and continuous multi-factor authentication systems have been developed to increase the security of devices and can be integrated with existing systems or new systems to provide additional factors for added security. By integrating such authentication systems with security systems for secure physical locations, the security of these secure physical locations could be greatly increased.

The present technology addresses this problem. By leveraging an integration of an authentication system and a security system, unauthorized individuals are more likely to be identified at the point of entry to secure physical locations and thus denied access to sensitive information.

Furthermore, even when authorized individuals obtain entry to secure physical locations, they may still act as adversaries and conduct espionage. The present technology further addresses this problem. While authorized individuals are within the secure physical location, the security system can limit capabilities of authorized individual's devices to prevent photography, audio/video recording, or other espionage capabilities. When the individual leaves the secure physical location, these capabilities can be re-enabled.

This disclosure will first discuss an example continuous multi-factor authentication (CMFA) system. Then, the disclosure will discuss example embodiments for increasing the security of secure physical locations that leverage an integration of an authentication system with a security system. Finally, the disclosure will discuss an example computing system which can be used to execute the present technology.

FIG. 1 illustrates an example continuous multi-factor authentication (CMFA) system in accordance with some aspects of the present technology. User 110 can gain authorized access to resource 170 by using CMFA device 120.

Resource 170 can be any service, resource, device, or entity which requires authentication of user 110. For example, resource 170 can be a social media service, bank, hospital, motor vehicle department, bar, voting system, Internet of Things (JOT) device, or access device. In some embodiments, resource 170 can be accessed by user 110 through an access device, such as a mobile phone or personal computer. In some embodiments, resource 170 can be accessed by user 110 through an application that is specifically designed for accessing resource 170, or through a more general application which can access multiple services, such as a web browser, or portions of an operating system. In some embodiments, resource 170 can be the same device as CMFA device 120. In some embodiments, resource 170 can be a plurality of resources, such as an access device and a service which receive separate authentications from trusted authentication provider 160.

Resource 170 can authenticate the identity of user 110 through trusted authentication provider 160, which can be in communication with CMFA device 120. Data gathered by CMFA device 120 can be used for authentication of user 110 to resource 170 via trusted authentication provider 160. Trusted authentication provider 160 can receive an identification credential, such as an IDActivKey, from CMFA device 120 via CMFA application 150 that is unique to resource 170 for user 110. Trusted authentication provider 160 can also receive a trust score from CMFA device 120 via trust score generator 140. Upon receiving an IDActivKey and a trust score, trusted authentication provider 160 can use this information in tandem with access requirements received from resource 170 to authenticate user 110 to resource 170.

To generate identification credentials, CMFA Device 120 can be associated with user 110 and can gather biometric, behavioral, and contextual data from user 110. The biometric, behavioral, or contextual data, or some combination thereof, can be used by IDActivKey generator 130 to generate a unique IDActivKey corresponding to resource 170. These biometrics can include, for example, fingerprints, facial detection, retinal scans, voice identification, or gait data, among other biometrics. For each resource 170, a cryptographic seed from a pseudo-arbitrary number generator in trusted platform module (TPM) 180 can be used to select a sampling of the biometric data to be used in an IDActivKey for the application in question. In some embodiments, the IDActivKey may only be derived when CMFA device 120 determines that certain behavioral and contextual requirements indicate compliance with a policy. In some embodiments, there can be a "master" IDActivKey that is used to gain access to trusted authentication provider 160.

In some embodiments, behavioral and contextual data can be used to ensure that the context of user 110 is acceptable as specified by a policy of resource 170. Behavioral and contextual data can be used by trust score generator 140, which can generate a trust score as a measure of confidence in the authentication of user 110, and as a measure of confidence that the authenticated user 110 is still present and behaving acceptably as specified by a policy of resource 170.

In some embodiments, trusted computing implementations, such as TPM 180, can rely on roots of trust. Roots of trust can provide assurances that the root has been implemented in a way that renders it trustworthy. A certificate can identify the manufacturer and evaluated assurance level (EAL) of TPM 180. Such certification can provide a level of confidence in the roots of trust used in TPM 180. Moreover, a certificate from a platform manufacturer may provide assurance that TPM 180 was properly installed on a system that is compliant with specific requirements so the root of trust provided by the platform may be trusted. Some implementations can rely on three roots of trust in a trusted platform, including roots of trust for measurement (RTM), storage (RTS), and reporting (RTR).

Trust score generator 140 can generate a trust score for user 110 using behavioral and contextual data, the surrounding environment, or other sources. For example, location information can be derived from the network that user 110 is using. These data can include information about location, movement, or device behavior. The trust score reflects a confidence level that user 110 complies with a policy specified by resource 170. This includes the confidence that user 110 is the person operating the current session.

Trusted authentication provider 160 can request updated IDActivKeys and trust scores at different intervals depending on the requirements specified by the access policies defined by resource 170. It can send new access policies received from resource 170 during a session to CMFA device 120. Trusted authentication provider 160 can shield private information from resource 170, providing authentication without revealing personal information such as birth dates, social security numbers, or marital status, etc. In some embodiments, trusted authentication provider 160 need only inform resource 170 that access should be granted, while in some embodiments trusted authentication provider 160 can send an IDActivKey to resource 170.

User 110 can be any user including an employee, contractor, client, member of an organization, or private individual, etc. attempting to access a service. User 110 can use an access device to access resource 170 which may or may not be the same device as CMFA device 120. In some embodiments, CMFA device 120 can be used to authenticate an access device.

CMFA device 120 can be hardware, software-only, or combinations thereof. CMFA device 120 can be a mobile device or a personal computer; it may or may not be the same device as access device. In some embodiments, CMFA device 120 can include secure hardware such as TPM 180. In some embodiments, one or more of IDActivKey generator 130, TPM 180, and trust score generator 140 can be located in a physically separate and secure portion of CMFA device 120.

While FIG. 1 only illustrates one resource 170, it should be appreciated that there can be any number of resources 170. Each resource 170 can have an access policy, and any IDActivKey will be unique to each respective resource 170.

On its own, the CMFA system illustrated in FIG. 1 provides a means to authenticate a user 110 using CMFA device 120. To use the authentication generated by the CMFA system to facilitate access to a secure physical location, the CMFA system can be integrated with a security system. These integrations are explored in FIGS. 2A and 2B.

Figure 2A:
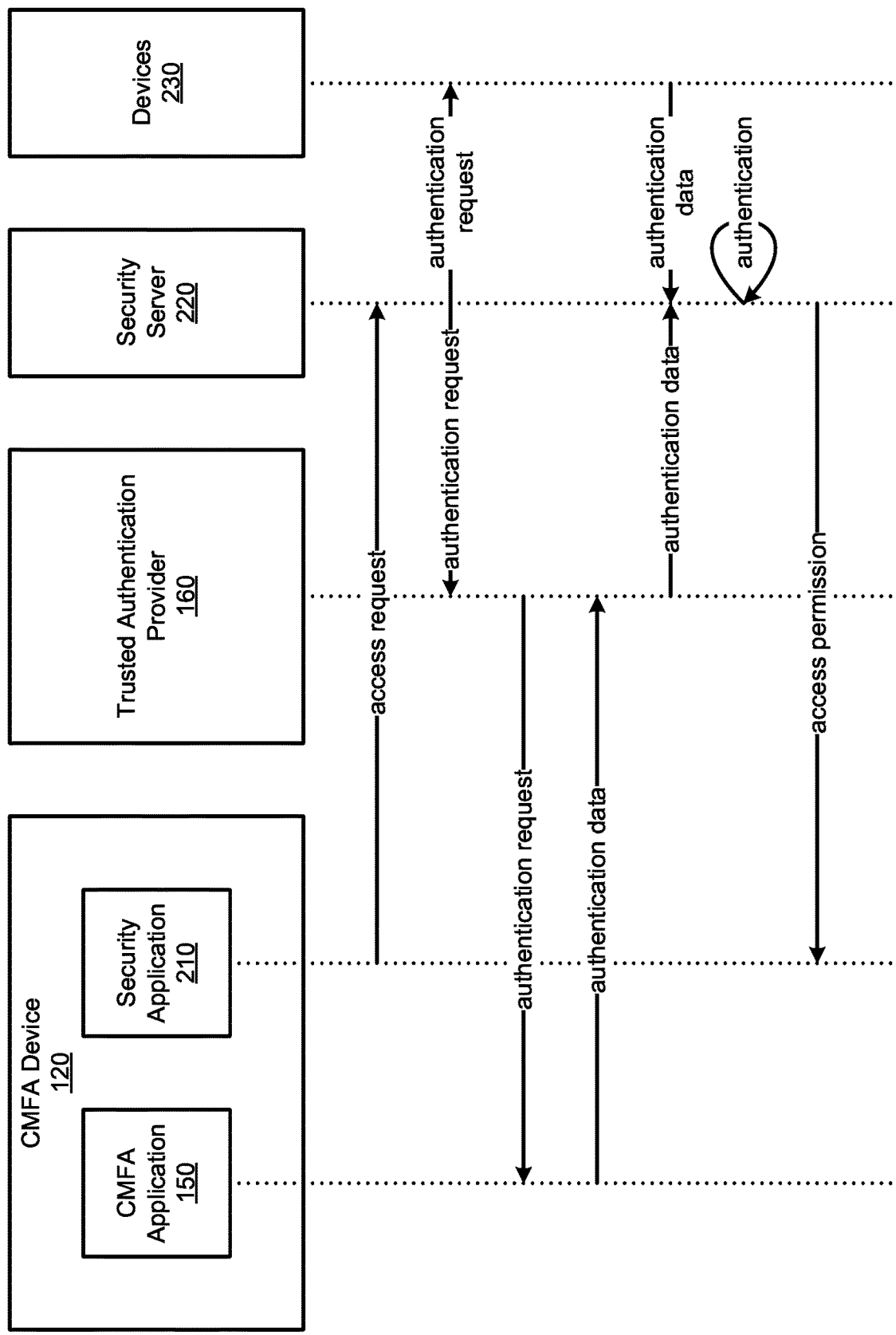
FIGS. 2A and 2B illustrate example sequence diagrams in accordance with some aspects of the present technology.

FIG. 2A illustrates an example sequence diagram in accordance with some aspects of the present technology. The sequence diagram illustrates how a CMFA system, such as that illustrated in FIG. 1, can be integrated with a security system to improve security for a secure physical location.

CMFA device 120 can run security application 210. Security application 210 can communicate with security server 220 as well as CMFA application 150 to integrate the CMFA system and the security system. Together, security application 210 and security server 220 can permit access to the secure physical location.

When a user, such as user 110 illustrated in FIG. 1, wants to gain access to the secure physical location, security application 210 on CMFA device 120 can send a request to access the secure physical location to security server 220, and security server 220 can receive the access request. The access request can also be triggered by having CMFA device 120 in proximity to an entrance to the secure physical location, CMFA device 120 communicating with an entrance device, or via other means. The access request can be received from the entrance device, such as a wall-mounted keypad, or other device. The access request can also be initiated by a user operating CMFA Device 120.

The access request can contain initial authentication data descriptive of user 110. This initial authentication data can speed up the authentication of user 110, or the initial authentication data may be necessary to begin the authentication process. The initial authentication data descriptive of user 110 may include biometrics, behavior, or context, as illustrated in FIG. 1.

In response to receiving the access request, security server 220 can request authentication data descriptive of user 110. Security server 220 can send a first request for a first portion of the authentication data descriptive of user 110 to trusted authentication provider 160, which can then forward the request to CMFA application 150 on CMFA device 120. The first request for the first portion of the authentication data descriptive of user 110 can specify characteristics of a type and/or quality of the first portion of authentication data descriptive of user 110, wherein the type and/or quality of the first portion of the authentication data descriptive of user 110 can be specified in an access policy for the secure physical location. The specified characteristics of the type and/or quality of the authentication data descriptive of user 110 can include biometrics, such as facial recognition data, fingerprint data, or vocal recognition data; behavior, such as activity on CMFA device 120; and/or context, such as the physical location of CMFA device 120 and, in turn, user 110.

The access policy can be defined by a security administrator, and can specify the conditions under which a user can access the secure physical location. Such conditions can include time of day, security clearance of the user, presence of other individuals, or other factors. The request to access the secure physical location can include requests from each user device, such as CMFA device 120, an access device operated by user 110, or other devices in proximity to the secure physical location.

Security server 220 can also send a second request for a second portion of the authentication data descriptive of user 110 to devices 230. Devices 230 can be in proximity to user 110 and the entrance to the secure area, and can include security cameras, Bluetooth devices, or Internet routers. Devices 230 can be devices in proximity to an entrance to the secure physical location. Devices 230 can be identified in an access policy for the secure physical location, and the access policy can specify characteristics of the second portion of the authentication data descriptive of user 110.

In some embodiments, as shown in FIG. 2A, security server 220 can receive authentication data descriptive of user 110 from CMFA application on CMFA device 120 via trusted authentication provider 160 and/or from devices 230. The authentication data descriptive of user 110 can contain data about an identity of user 110 and a physical location of user 110. When the original request to access the secure area contains initial authentication data descriptive of user 110, or when server 220 has otherwise obtained initial authentication data, based on the initial authentication data descriptive of the user, server 220 can request authentication data descriptive of the user from trusted authentication provider 160 and receive the authentication data descriptive of the user 110 from trusted authentication provider 160. A continuous multi-factor authentication system, such as the one illustrated in FIG. 1 and represented by CMFA application 150 on CMFA device 120 and trusted authentication provider 160, can generate the authentication data descriptive of user 110, which can include biometrics, behavior, and/or context. The authentication data descriptive of user 110 can be generated from authentication factors received from CMFA device 120 or a related access device and/or from devices 230, and can be generated by security server 220.

Security server 220 can perform an authentication of user 110 using the authentication data descriptive of user 110 received from trusted authentication provider 160 and/or devices 230. Security server 220 can evaluate the authentication data descriptive of user 110 against authentication criteria. These authentication criteria can be set by a security administrator, and can set thresholds for trust scores, number of authentication factors available, or other parameters.

In some embodiments, trusted authentication provider 160 can receive authentication data descriptive of user 110 and perform the authentication of user 110. The authentication data descriptive of user 110 can be received from CMFA device 120 and/or from devices 230. Trusted authentication provider 160 can evaluate the authentication data descriptive of user 110 against authentication criteria and send the evaluation to security server 220.

User 110 can be permitted to access the secure physical location when the authentication data descriptive of user 110 associated with CMFA device 120 meets authentication criteria defined in an access policy configured on trusted authentication provider 160, security server 220, or another service. Security server 220 or trusted authentication provider 160 can determine that the personal identifying information in the authentication data descriptive of the user identifies an individual other than user 110, and can provide access or take additional steps as defined in an access policy for the secure physical location, where the access policy can define a protocol for user 110 to be accompanied by a non-authenticated individual.

Security server 220 can permit user 110 to access the secure physical location and send this permission to security application 210 on CMFA device 120. Security server 220 or security application 210 can send a communication to a lock actuation device associated with the secure physical location, wherein the communication is a trusted communication which indicates that user 110 associated with CMFA device 120 should be permitted to access the secure physical location.

Permitting multiple users 110 to access the secure physical location can be conditional upon receiving authentication data descriptive of each user 110 associated with a respective CMFA device 120 that meets authentication criteria defined in an access policy. Access policies can allow one user 110 to authorize another user 110 with certain levels of security clearance, or as guests, including via printing authentication materials like guest badges.

Granting access can be withheld until certain other criteria are met. When multiple people are in a party and not all are independently authorized as detailed above, there can be a separate protocol for guest clearance before access is granted. Guests may be asked to download security application 210 on their own devices, or to leave their own devices at the entrance location, or to turn off their devices. Security application 210 can, for instance, be downloaded via a QR code posted next to the entrance to the secure physical location. For authorized users, they may be asked to leave secondary devices at the entrance location or download security application 210 on these secondary devices or turn off secondary devices. Devices can be detected at the entrance using metal detectors or other types of scanners and confiscated.

The integration of the authentication system and the security system allows the security system to better assure the identity of a user requesting access, and thus better protect the assets within the secure physical location. However, even authorized users can become security threats. The present technology, in addition to securing the entrances of secure physical locations, can prevent espionage while users are within the secure physical location.

Figure 2B:
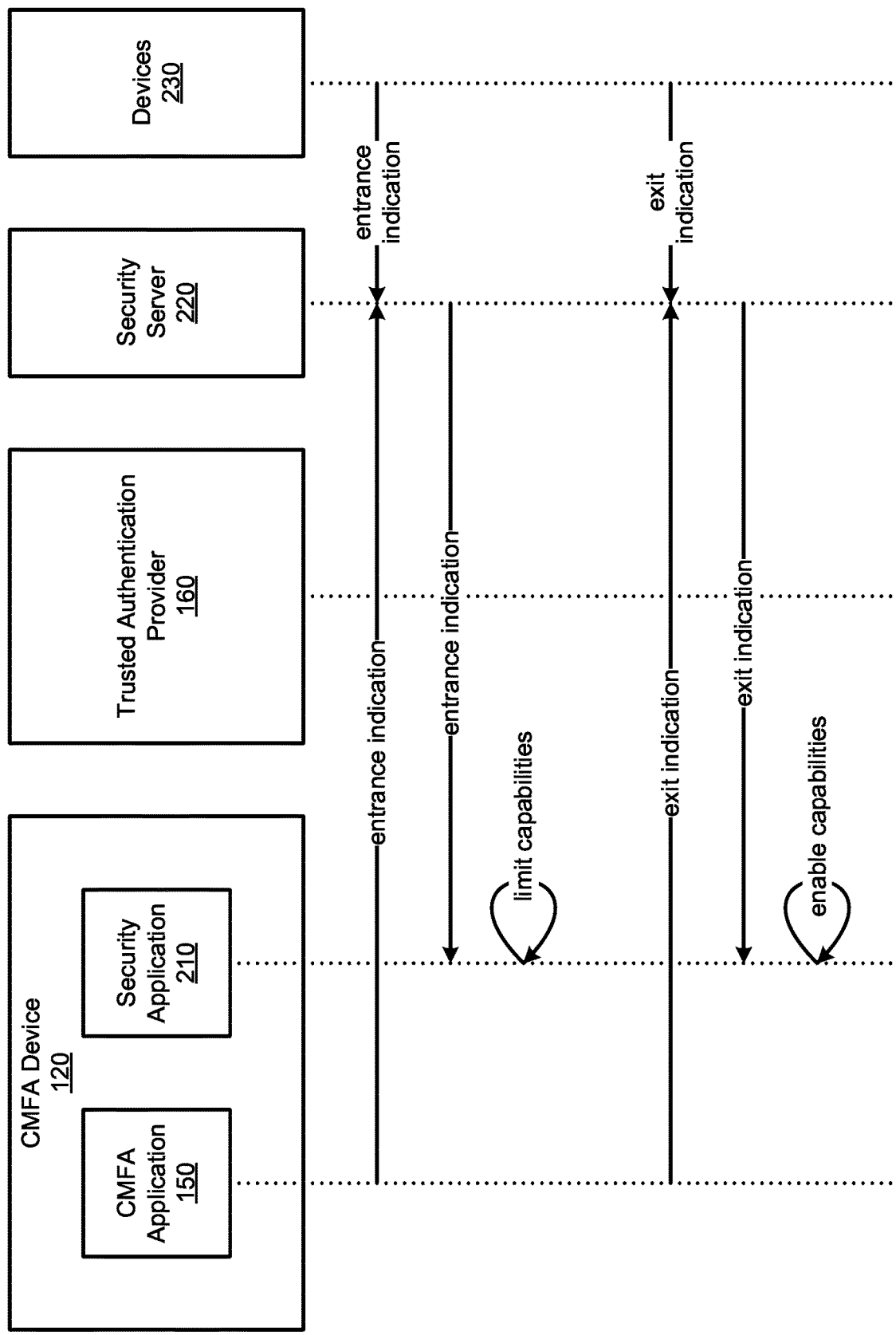

FIG. 2B illustrates an example sequence diagram in accordance with some aspects of the present technology. The sequence diagram illustrates how a CMFA system, such as that illustrated in FIG. 1, can be integrated with a security system to improve security for a secure physical location.

Security server 220 can receive an indication that the user is within the secure physical location from CMFA application 150 on CMFA device 120 and/or from devices 230. Devices 230 can include security cameras, Wi-Fi access points, or Bluetooth beacons. This indication can occur after user 110 has been given permission to access the secure physical location, as illustrated in FIG. 2A.

Security server 220 can forward the entrance indication to security application 210 and thus limit capabilities of CMFA device 120 while user 110 is within the secure physical location. Security application 210, under instructions from security server 220, can disable certain functions of CMFA device 120, such as microphone functions, camera functions, Bluetooth functions, Wi-Fi functions, and/or cellular data functions.

Security server 220 via security application 210 can disable the certain functions of CMFA device 120 by using a virtual private network to block all network access to CMFA device 120. Security server 220 can limit the capabilities of CMFA device 120 by sending a communication to security application 210 on CMFA device 120 informing security application 110 about at least one secure area technological requirement as defined in an access policy configured on an authentication service such as trusted authentication provider 150, and receive a communication from security application 210 confirming that CMFA device 120 has been configured to meet the at least one secure area technological requirement. The secure area technological requirements can include having up-to-date operating systems, applications, hardware, and/or other requirements.

Security server 220 via security application 210 can limit the capabilities of CMFA device 120 prior to permitting user 110 to access the secure physical location. Security server 220 via security application 210 can limit the capabilities of CMFA device 120 after CMFA device 120 or user 110 is detected within the secure physical location. These limitations can serve to reduce the likelihood of espionage committed by user 110. What capabilities are limited can be set by an access policy, and can vary with security clearance, number of users, time of days, type of user device, or other factors.

Security server 220 can receive an indication that user 110 is not within the secure physical location. Security server 220 can receive the exit indication from devices 230, including Bluetooth beacons, ultrasonic beacons, and/or QR codes, and/or from CMFA application 150 on CMFA device 120.

Security server 220 can forward the exit indication to security application 210, which can enable all functions of CMFA device 120.

Figure 3:
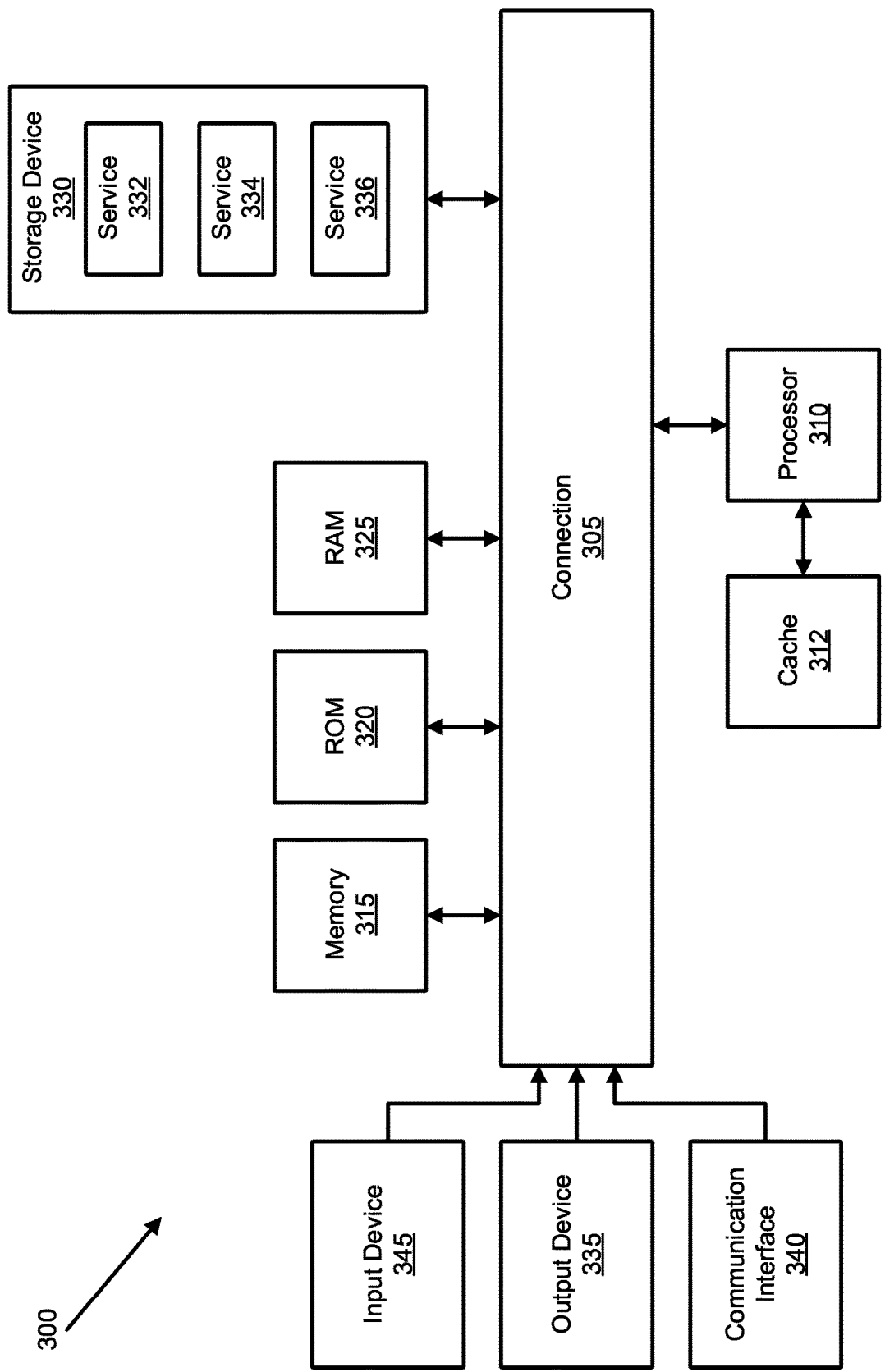
FIG. 3 illustrates an example system for implementing certain aspects of the present technology.

FIG. 3 shows an example of computing system 300, which can be for example any computing device making up CMFA device 120 or security server 220, or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments, computing system 300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read-only memory (ROM) 320 and random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement, and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The invention claimed is:

1. A method comprising:
receiving authentication data descriptive of a user associated with a user device;
receiving a request from a user associated with a user device to access a secure physical location;
in response to receiving the request for the user to access the secure physical location:
sending a first request for a first portion of authentication data descriptive of the user to a continuous multi-factor authentication application on the user device;
sending a second request for a second portion of authentication data descriptive of the user to at least one device in proximity to an entrance to the secure physical location;

receiving, in response to the second request, the second portion of authentication data from a camera which independently identifies the user;
authenticating the user based on responses to the first request and the second requested;
granting, in response to the authenticating, the user access to the secure physical location;
while the user is within the secure physical location, disabling video and/or audio recording capabilities of the user device; and
reenabling, in response to the user leaving the secure physical location, the disabled video and/or audio recording capabilities of the user device.

2. The method of claim 1, wherein the first request for the first portion of the authentication data descriptive of the user specifies characteristics of a type and/or quality of the first portion of the authentication data descriptive of the user, wherein the type and/or quality of the first portion of the authentication data descriptive of the user is specified in an access policy for the secure physical location.

3. The method of claim 1, wherein the user is permitted to access the secure physical location when the authentication data descriptive of the user associated with the user device meets authentication criteria defined in an access policy configured on an authentication service.

4. The method of claim 1, wherein permitting the user to access the secure physical location further comprises:
sending a communication to a lock actuation device associated with the secure physical location, wherein the communication is a trusted communication which indicates that the user associated with the user device should be permitted to access the secure physical location.

5. The method of claim 1, wherein limiting the capabilities of the user device comprises:
receiving, from the user device, an indication that the user is about to enter or has entered the secure physical location;
sending a communication to a security application on the user device informing the security application about at least one secure area technological requirement as defined in an access policy configured on an authentication service; and
receiving a communication from the security application confirming that the user device has been configured to meet the at least one secure area technological requirement.

6. The method of claim 1, further comprising:
receiving personal identifying information from at least one device in proximity to the user;
determining that the personal identifying information identifies an individual other than the user of the user device; and
providing access or taking additional steps as defined in an access policy for the secure physical location, wherein the access policy defines a protocol for an authenticated user being accompanied by a non-authenticated individual.

7. The method of claim 1, wherein the at least one device in proximity to an entrance is the camera.

8. A system comprising:
at least one processor; and
a non-transitory computer-readable storage medium comprising instructions stored thereon which, when executed by the at least one processor, cause the at least one processors to perform operations comprising:
receive authentication data descriptive of a user associated with a user device;
receive a request from a user associated with a user device to access a secure physical location;
in response to receiving the request for the user to access the secure physical location:
send a first request for a first portion of authentication data descriptive of the user to a continuous multi-factor authentication application on the user device;
send a second request for a second portion of authentication data descriptive of the user to at least one device in proximity to an entrance to the secure physical location;
receive, in response to the second request, the second portion of authentication data from a camera which independently identifies the user;
authenticate the user based on responses to the first request and the second request;
grant, in response to the authenticating, the user access to the secure physical location;
while the user is within the secure physical location, disabling video and/or audio recording capabilities of the user device; and
reenable, in response to the user leaving the secure physical location, the disabled video and/or audio recording capabilities of the user device.

9. The system of claim 8, wherein the first request for the first portion of the authentication data descriptive of the user specifies characteristics of a type and/or quality of the first portion of the authentication data descriptive of the user, wherein the type and/or quality of the first portion of the authentication data descriptive of the user is specified in an access policy for the secure physical location.

10. The system of claim 8, wherein the at least one processor and the non-transitory computer-readable storage medium are part of a security system.

11. The system of claim 8, wherein the at least one device in proximity to an entrance is the camera.

12. A non-transitory computer-readable storage medium comprising storing instructions stored thereon which, when executed by a processor, cause the processor to perform operations comprising:
receive authentication data descriptive of a user associated with a user device;
receive a request from a user associated with a user device to access a secure physical location;
in response to receiving the request for the user to access the secure physical location:
send a first request for a first portion of authentication data descriptive of the user to a continuous multi-factor authentication application on the user device;
send a second request for a second portion of authentication data descriptive of the user to at least one device in proximity to an entrance to the secure physical location;
receive, in response to the second request, the second portion of authentication data from a camera which independently identifies the user;
authenticate the user based on responses to the first request and the second request;
grant, in response to the authenticating, the user access to the secure physical location;
while the user is within the secure physical location, disable video and/or audio recording capabilities of the user device; and reenable, in response to the user leaving the secure physical location, the disabled video and/or audio recording capabilities of the user device.

13. The non-transitory computer-readable storage medium of claim 12, wherein the user is permitted to access the secure physical location when the authentication data descriptive of the user associated with the user device meets authentication criteria defined in an access policy configured on an authentication service.

14. The non-transitory computer-readable storage medium of claim 12, wherein permitting the user to access the secure physical location causes the processor to:
    send a communication to a lock actuation device associated with the secure physical location, wherein the communication is a trusted communication which indicates that the user associated with the user device should be permitted to access the secure physical location.

15. The non-transitory computer-readable storage medium of claim 12, wherein limiting the capabilities of the user device causes the processor to:
    receive, from the user device, an indication that the user is about to enter or has entered the secure physical location;
    send a communication to a security application on the user device informing the security application about at least one secure area technological requirement as defined in an access policy configured on an authentication service; and
    receive a communication from the security application confirming that the user device has been configured to meet the at least one secure area technological requirement.

16. The non-transitory computer-readable storage medium of claim 12, further causing the processor to:
    receive personal identifying information from at least one device in proximity to the user;
    determine that the personal identifying information identifies an individual other than the user of the user device; and
    provide access or taking additional steps as defined in an access policy for the secure physical location, wherein the access policy defines a protocol for an authenticated user being accompanied by a non-authenticated individual.

17. The non-transitory computer-readable storage medium of claim 12, wherein the at least one device in proximity to an entrance is the camera.

* * * * *